United States Patent
Laur

[15] 3,692,737
[45] Sept. 19, 1972

[54] STABLE POLYDIORGANOSILOXANE GUMS

[72] Inventor: Thomas L. Laur, Sanford, Mich.
[73] Assignee: Dow Corning Corporation, Midland, Mich.
[22] Filed: Feb. 1, 1971
[21] Appl. No.: 111,639

[52] U.S. Cl......260/45.75 R, 260/37 SB, 260/46.5 G
[51] Int. Cl.........................C08g 51/04, C08g 51/56
[58] Field of Search........260/45.75 R, 37 SB, 46.5 G

[56] References Cited

UNITED STATES PATENTS 3,377,312   4/1968   Baney.......................260/46.5
3,635,874   1/1972   Laur et al. ...................260/37
3,647,741   3/1972   Hutchinson ..................260/37

OTHER PUBLICATIONS

German Patent Publication Offenlegungsschrift 1,963,118, published July 2, 1970, to Hutchinson, W. E.

Primary Examiner—Donald E. Czaja
Assistant Examiner—V. P. Hoke
Attorney—Robert F. Fleming, Jr., Laurence R. Hobey, Harry D. Dingman, Howard W. Hermann and Roger H. Borrousch

[57]  ABSTRACT

Polydiorganosiloxane gum is stabilized by the addition of fume titanium dioxide. The stabilized polydiorganosiloxane gums can be used to make silicone rubbers and adhesives.

2 Claims, No Drawings

STABLE POLYDIORGANOSILOXANE GUMS

This invention relates to stable polydiorganosiloxane gum and the method of stabilization.

The use of fume titanium dioxide to provide a heat stable silicone rubber is known as shown by German Patent Publication OLS 1,963,118 by W. E. Hutchinson, published July 2, 1970. Hutchinson shows that fume titanium dioxide is useful in making silicone rubber heat stable when present in an amount of from 3 to 10 weight percent based on the weight of the organopolysiloxane. Less than three weight percent fume titanium dioxide resulted in silicone rubber which became brittle and decomposed when exposed to high temperatures.

Polydiorganosiloxane gums are usually prepared by alkaline polymerization methods. These methods provide gums which contain alkaline residues, such as potassium and sodium ions. Processes for the neutralization or removal of these alkaline residues are necessary to provide a gum which will not depolymerize during other processing and storage. Even careful neutralization of these gums, still leaves small amounts of these alkaline residues which even in amounts such as 10 to 20 parts per million based on the weight of the gum, can result in undesirable depolymerizations and other detrimental reactions. The removal of such minute amounts is extremely difficult because of the highly viscous nature of the gums. Previously, small amounts of finely divided silica was added to these gums to stabilize the effects of the alkaline residues which cannot be removed by any economical means. The silica is effective since a more stable gum is obtained and the small amounts of the silica do not interfere with any of the ultimate uses of the gum.

It is an object of this invention to provide a polydiorganosiloxane gum which is more stable than the polydiorganosiloxane gum with silica. Quite unexpectedly it has been found that small amounts of fume titanium dioxide would inactivate the effects of the alkaline residue and provide a more stable polydiorganosiloxane gum.

This invention relates to a uniform mixture consisting of 100 parts by weight of a polydiorganosiloxane gum wherein each organic radical is selected from a group consisting of a methyl radical, a vinyl radical, a 3,3,3-trifluoropropyl radical and a phenyl radical, there being from 1.98 to 2.002 inclusive organic radicals per silicon atom in the polydiorganosiloxane gum and from 0.1 to 2 inclusive parts by weight fume titanium dioxide, said fume titanium dioxide having an average particle diameter of less then 0.10 micron.

The polydiorganosiloxane gums can be prepared by well-known methods such as the alkaline polymerization method described by Hyde in U.S. Pat. No. 2,490,357. Other alkaline processes are described by Warrick in U.S. Pat. No. 2,634,252, by Hyde in U.S. Pat. No. 2,634,284 and by Johannson in U.S. Pat. No. 3,002,951. The polydiorganosiloxane gums are well known in the art and can be illustrated by those polymers, copolymers and mixtures thereof wherein the repeating units are represented by dimethylsiloxane, phenylmethylsiloxane, 3,3,3-trifluoropropylmethylsiloxane, diphenylsiloxane, methylvinylsiloxane and phenylvinylsiloxane units. The polydiorganosiloxane gums can have an average of 1.98 to 2.002 silicon bonded organic radicals per silicon atom with the terminating units being triorganosiloxy units, hydroxyl groups or alkoxy groups. The triorganosiloxy units can be illustrated by trimethylsiloxy, dimethylvinylsiloxy, methylphenylvinylsiloxy, methyldiphenylsiloxy, 3,3,3-trifluoropropyldimethylsiloxy and the like.

The fume titanium dioxide has an average particle size of less than 0.10 micron in diameter. Fume titanium dioxide is commercially prepared by flame hydrolysis of titanium tetrachloride. The fume titanium dioxide for purposes of this invention must have an average particle size of less than 0.10 micron in diameter. When titanium dioxide, such as pigment grade titanium dioxide is used, the stabilization effect is no different than when silica is used.

Mixing the fume titanium dioxide with the polydiorganosiloxane gum in amounts from 0.1 to 2 parts by weight based on 100 parts by weight of the polydiorganosiloxane, provides a stable polydiorganosiloxane which does not change its properties upon storage, such as activity, molecular weight, and the like. Amounts of at least 0.1 part by weight fume titanium dioxide per 100 parts by weight of the polydiorganosiloxane gum is required to stabilize the gums. More than 2 parts by weight of the fume titanium dioxide per 100 parts by weight of the polydiorganosiloxane gum begins to show an undesirable pigmenting effect. Preferably, from 0.5 to 1.5 parts of the fume titanium dioxides are used per 100 parts by weight of the polydiorganosiloxane gum.

The fume titanium dioxide can be mixed with the polydiorganosiloxane gum in any suitable manner to provide a uniform mixture. The best method is to add the fume titanium dioxide into the polydiorganosiloxane gum in a dough mixer or a finger mixer. Other methods of mixing such as milling can also be used.

The mixture provides a stable polydiorganosiloxane gum for storage. The gum is also stabilized for further processing such as for devolatilization processes wherein volatile materials resulting from polymerization are removed. The gum can then be used to make silicon elastomers, adhesives and the like.

The following example is illustrative only and should not be construed as limiting the present invention which is properly delineated in the appended claims.

EXAMPLE

A polydiorganosiloxane gum having 99.858 mol percent dimethylsiloxane units, 0.142 mol percent methylvinylsiloxane units and dimethylvinylsiloxy endblock units was prepared by a potassium hydroxide polymerization. This polydiorganosiloxane gum was divided into four portions. Fume silica, fume titanium dioxide having an average particle diameter of 0.03 micron and pigment grade titanium dioxide having an average particle diameter of 0.2 micron was milled into three of the gum portions to provide 1.0 part by weight per 100 parts by weight of gum. A two roll rubber mill was used and the mixtures were milled until they were uniformly mixed. No additions were made to the fourth portion of gum. The four specimens were then heated progressively for 24 hours at 150° C. plus 24 hours at 200° C. plus 24 hours at 250° C. plus 24 hours at 316° C. The weight of the specimens was determined initially and after each heating period. This heating schedule provided an accelerated storage test. The results were as shown in the following table.

TABLE

| Specimen | % Weight Loss After | | | |
|---|---|---|---|---|
| | 24 hrs. at 150°C | +24 hrs. at 200°C | +24 hrs. at 250°C | +24 hrs. at 316°C |
| Gum | 5.0 | 32.6 | 99.7 | 100.0 |
| Gum + silica | 4.6 | 5.4 | 11.8 | 46.7 |
| Gum + fume titanium dioxide | 4.6 | 5.6 | 6.2 | 24.4 |
| Gum + pigment titanium dioxide | 4.8 | 8.0 | 14.8 | 47.5 |

That which is claimed is:

1. A uniform mixture consisting of 100 parts by weight of a polydiorganosiloxane gum wherein each organic radical is selected from a group consisting of a methyl radical, a vinyl radical, a 3,3,3-trifluoropropyl radical and a phenyl radical, there being from 1.98 to 2.002 inclusive organic radicals per silicon atom in the polydiorganosiloxane gum and from 0.1 to 2 inclusive parts by weight fume titanium dioxide, said fume titanium dioxide having an average particle diameter of less than 0.10 micron.

2. The mixture in accordance with claim 1 in which the fume titanium is present in an amount of from 0.5 to 1.5 inclusive parts by weight.

* * * * *